United States Patent [19]
Banakis et al.

[11] Patent Number: 5,987,741
[45] Date of Patent: Nov. 23, 1999

[54] METHOD OF FABRICATING AN IC CARD

[75] Inventors: Emanuel G. Banakis, Naperville; Kenneth F. Janota, Lisle; Harold Keith Lang, Fox River Grove, all of Ill.

[73] Assignee: Molex Incorporated, Lisle, Calif.

[21] Appl. No.: 08/873,358

[22] Filed: Jun. 12, 1997

Related U.S. Application Data

[63] Continuation of application No. 08/264,388, Jun. 23, 1994, abandoned.

[51] Int. Cl.$^6$ ........................................................ H01R 9/00
[52] U.S. Cl. .................................. 29/842; 29/884; 439/74; 439/79; 439/95; 439/629
[58] Field of Search ................................ 439/74, 79, 329, 439/636, 95, 629; 29/889; 174/51

[56] References Cited

U.S. PATENT DOCUMENTS 5,046,955  9/1991  Olssen .
5,502,620  3/1996  Funck et al. .
5,504,994  4/1996  Banakis et al. .
5,747,735  5/1998  Chang et al. .

*Primary Examiner*—Carl J. Arbes
*Attorney, Agent, or Firm*—James C. Paschall

[57] ABSTRACT

An IC card includes a generally rectangular frame. A circuit board assembly is mounted on the frame, with the circuit board assembly including a generally planar dielectric substrate having circuit traces and at least one electrical component mounted thereon. A receptacle connector including terminals is mounted at an edge of the circuit board assembly, with the terminals being adapted to mechanically and electrically engage the circuit traces on the circuit board assembly. Complementary interengaging latches are provided between the frame and the receptable connector for securing the receptacle connector at the edge of the circuit board assembly and for ensuring a mechanical and electrical connection between the terminals and the circuit traces on the circuit board assembly. The invention also contemplates a method of fabricating the IC card according to the above.

6 Claims, 3 Drawing Sheets

METHOD OF FABRICATING AN IC CARD

This is a continuation of application Ser. No. 08/264,388 filed on Jun. 23, 1994 abandoned.

FIELD OF THE INVENTION

This invention generally relates to the art of electrical connectors for mounting on a circuit board and, particularly, to a mounting means for a receptacle connector of an IC card.

BACKGROUND OF THE INVENTION

Generally, IC cards or packs, such as memory cards, are data input devices which are electrically connected to an electronic apparatus or storage device, such as a word processor, personal computer or other electronic apparatus. The data stored in the IC card is transferred to the electronic apparatus. Memory cards are portable instruments which are readily inserted and extracted from a connector apparatus which may be used with the IC card for removably coupling the IC card to a printed circuit board, for instance.

An IC card conventionally includes a frame which usually is generally rectangular and includes an opening in either a top surface or a bottom surface thereof or, in some constructions, in both surfaces. The opening receives a circuit board assembly, and a panel or cover closes the opening and encloses the circuit board assembly within the frame.

The circuit board assembly of an IC card conventionally includes a generally planar dielectric substrate with circuit traces and at least one electrical component mounted thereon. The electrical component(s) may include semiconductor devices, integrated circuits, batteries or the like. A surface mounted receptacle connector is electrically and mechanically coupled to an edge of the circuit board assembly. The receptacle connector includes receptacle terminals or contacts mounted therein and having tail portions adapted to be surface mounted to corresponding circuit traces on the substrate of the circuit board assembly. Each receptacle contact also includes a receptacle portion for mating with contacts of the main electronic apparatus, such as mating with the contacts of a header connector mounted on a printed circuit board of the main electronic apparatus.

Since the receptacle connector is surface mounted to the circuit board assembly, and the connector and assembly, in turn, are mounted to the frame and cover, it is important that the connector be positioned correctly with respect to the circuit board assembly, that is, the tail portions of the receptacle contacts must be accurately positioned and connected to their corresponding circuit traces so that proper electrical connection is made. It is often desirable, if not necessary, to hold the connector in place prior to and during the surface mounting process (i.e. a reflow soldering process, for instance), so that movement prior to or surface tension during the process does not result in an inaccurately positioned connector.

Since the circuit substrates used in IC and memory cards are typically substantially thinner than those used in other applications (due primarily to the desire to miniaturize and weight reduce the overall product), another difficulty encountered during the surface mount soldering processing of these cards is the tendency toward an increase in the amount of substrate movement, such as bowing, warping, and flexing, due to thermal expansion and contraction during the process compared to thicker circuit substrates.

The relatively long receptacle connectors are adversely affected by this movement, since the solder may cool and harden on some of the circuit pads while the circuit substrate is momentarily bowed away from the plane of the solder tail portions, resulting in open circuits.

To solve this problem, a connector design that holds the connector to the circuit substrate and generates positive force between the solder tails and the substrate is desirable, so that the solder tails remain in contact with the surface of the substrate as it bows and flexes during processing.

Most often, the receptacle connector of an IC card is mounted at an edge of the printed circuit board assembly. Particularly in the case of a single-sided receptacle connector where forces are exerted on only one side of the substrate which may cause the connector to "rock" or tilt, care must be taken to mechanically secure the receptacle connector to the substrate of the printed circuit board assembly prior to and during processing thereof.

Still further, care must be taken when holding the receptacle connector in proper position. Too little retention to the board is of no use, and may result in open circuit conditions or intermittencies should the surface mount tail portions of the contacts "float" off their respective circuit traces or move off their requisite positions. On the other hand, too much retention can cause excessive insertion force and make assembly of the connector to the board difficult, if not impossible.

One method of assembling a single-sided IC card receptacle connector to a circuit board substrate involves processing only the receptacle connector and the circuit board assembly prior to securing the assembly and connector to the IC card frame. However, means must be provided for supporting the connector with respect to the circuit board substrate by way of fixtures and/or additional circuit board real estate which then is cut away after the processing and discarded. This may be costly in terms of time and labor. For instance, U.S. Pat. No. 5,277,596 to Dixon, dated Jan. 11, 1994, shows a method of fabricating an edge mounted receptacle connector to a circuit board assembly of an IC card by mounting the receptacle connector within an opening of the circuit board substrate prior to soldering the connector contacts thereto. The periphery of the circuit board substrate then is cut off and discarded. Such procedures, as well as separate supporting fixtures for the receptacle connector, are time, labor and cost intensive.

A solution to such problems is shown in copending application Ser. No. 08/156,171, filed Nov. 22, 1993 and assigned the assignee of the present invention. That application solves the problems by providing an improved board mounting peg means between the receptacle connector and the circuit board substrate. However, again, the connector is mounted to the substrate and processed prior to mounting this overall assembly within the IC card frame. The present invention is directed to a further improvement in the art wherein the circuit board substrate is secured to the frame, and the receptacle connector, in turn, is latched to the frame in proper position for ensuring a mechanical and electrical connection between the connector contacts and the circuit board traces during processing.

SUMMARY OF THE INVENTION

An object, therefore, of the invention is to provide a new and improved mounting system for a receptacle connector in an IC card.

Another object of the invention is to provide a new an improved method of fabricating an IC card.

In the exemplary embodiment of the invention, an IC card is disclosed to include a generally rectangular frame. A circuit board assembly is mounted on the frame with the circuit board assembly including a generally planar dielectric substrate having electronic circuitry including circuit traces and at least one electrical component mounted thereon. A receptacle connector including terminals is mounted at an edge of the circuit board assembly, with the terminals adapted to mechanically and electrically engage corresponding circuit pads of the circuit traces on the circuit board assembly.

The invention contemplates the provision of complementary interengaging latches between the frame and the receptacle connector for securing the receptacle connector at the edge of the circuit board assembly and for ensuring a mechanical and electrical connection between the terminals and the circuitry on the circuit board assembly.

In the preferred embodiment of the invention, the receptacle connector is elongated, and the frame includes an opening therein for receiving the elongated connector. The complementary interengaging latches comprise snap-latches located at opposite ends of the receptacle connector and at the sides of the opening in the frame. The snap-latches interengage in response to properly positioning the receptacle connector in the opening in the frame.

The invention contemplates that the terminals of the receptacle connector include surface mount portions for mechanically and electrically engaging circuit traces on one side of the circuit board assembly. The surface mount portions are resilient, and the complementary interengaging latches are effective to spring bias or preload the surface mount portions against the circuit traces on the one side of the circuit board assembly.

Lastly, the invention contemplates a method of fabricating the IC card as described above. Specifically, the method includes mounting the circuit board assembly on the frame and, in turn, latching the receptacle connector to the frame in position for securing the connector at the edge of the circuit board assembly and for ensuring a mechanical and electrical connection between the connector terminals and the circuit traces on the circuit board assembly.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
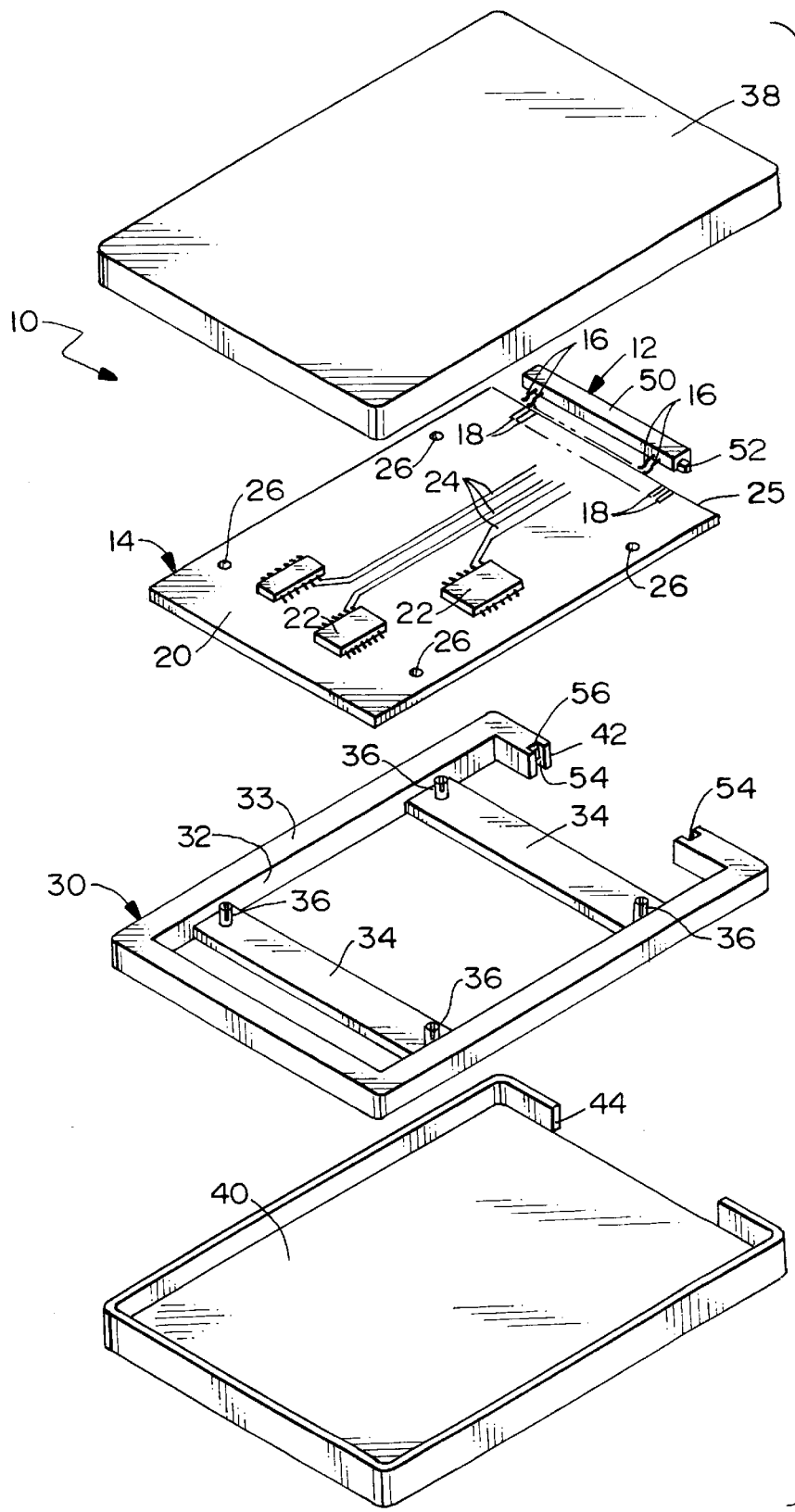
FIG. 1 is an exploded perspective view of the elements of an IC card in which the invention is applicable.

Referring to the drawings in greater detail, and first to FIG. 1, the invention is embodied in an IC card, generally designated 10, which is provided as a data input device, such as a memory card, for connection to an electronic apparatus or storage device, such as a word processor, personal computer or other electronic apparatus (not shown). The data stored in memory card 10 is transferred to the electronic apparatus through the terminals within a receptacle connector, generally designated 12, which is edge mounted to a circuit board assembly, generally designated 14.

Receptacle connector 12 is elongated and mounts a plurality of input terminals that have surface mount portions or tails 16 that are visible in FIG. 1. The terminals mechanically and electrically engage contact pads 18 on a dielectric substrate 20 of circuit board assembly 14. Various electrical components or circuit elements 22 are surface mounted on substrate 20, along with circuit traces 24 leading to contact pads 18 at the leading or front edge 25 of the substrate. This edge is coupled to elongate receptacle connector 12, and the receptacle connector is interconnectable with an electrical connector, such as a header connector on a printed circuit board of the electronic apparatus to which data stored in circuit board assembly 14 is transferred.

The above description of circuit board assembly 14 is generally conventional and, consequently, the depiction of the circuit board assembly is somewhat schematic. However, it should be understood that, although electrical components 22 are shown in the drawings as being flat objects, the components may comprise semi-conductor devices, batteries, or other parts of integrated circuits on substrate 20 of the circuit board assembly. Lastly, according to the invention, a plurality (four) mounting holes 26 or the like are formed in substrate 20 of the circuit board assembly.

Still referring to FIG. 1, IC card 10 includes a frame, generally designated 30, which includes an opening 32 in a top surface 33 thereof for receiving circuit board assembly 14. The frame includes a pair of support rails 34 for supporting the circuit board assembly within the frame. A plurality (four) of mounting pegs 36 project upwardly from rails 34 for insertion into mounting holes 26 in the circuit board assembly. A top panel or cover 38 and a bottom panel or cover 40 are fixably secured to the top and bottom surfaces of frame 30, as by appropriate adhesives or structural latch configurations for closing opening 32 and enclosing circuit board assembly 14 within the frame. The frame is unitarily molded of dielectric material, such as plastic. According to the invention, the frame has an opening 42 in the front thereof for receiving and securing receptacle connector 12 therewithin, as described hereinafter. Covers 38 and 40 also include front openings 44 for accommodating the receptacle connector, although the opening is visible only in the bottom cover in FIG. 1.

Figure 2:
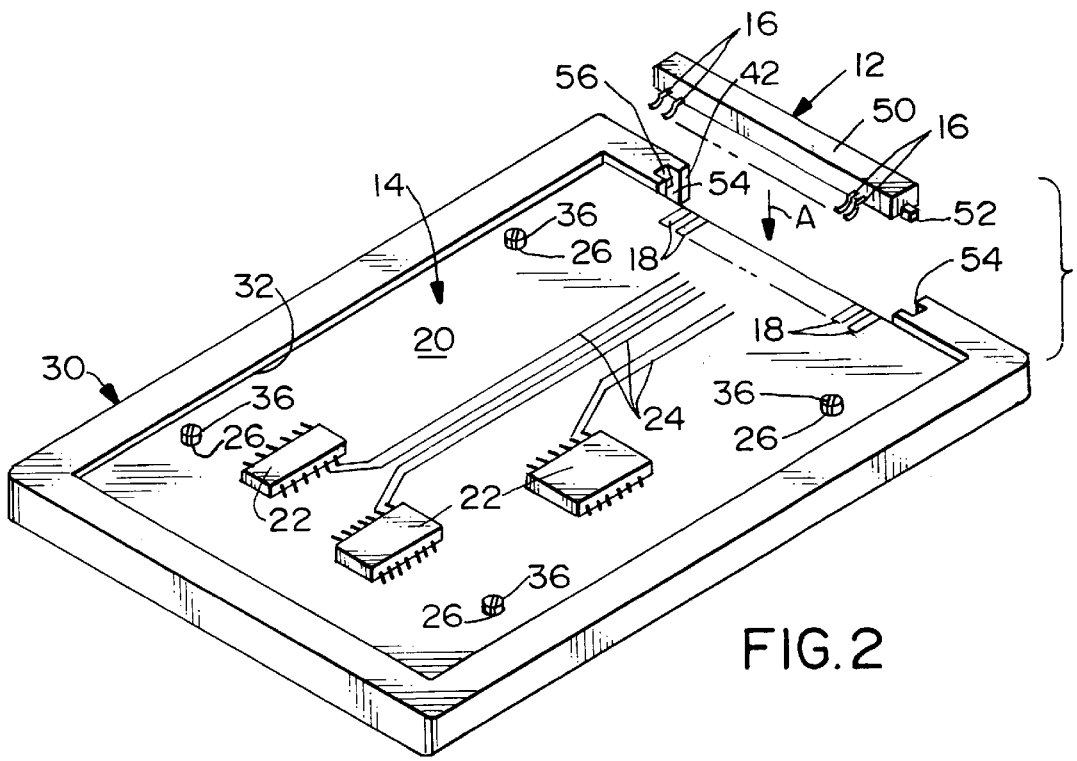
FIG. 2 is a perspective view of the circuit board assembly mounted on the frame, with the receptacle connector about to be latched in an opening in the frame.

FIG. 2 shows printed circuit board assembly 14 mounted within opening 32 in frame 30. The circuit board assembly rests on top of support rails 34 (FIG. 1), and it can be seen how mounting pegs 36 project upwardly from the rails through mounting holes 26 in substrate 20 of the circuit board assembly. FIG. 2 shows receptacle connector 12 spaced above the subassembly of frame 30 and printed circuit board assembly 14. However, the receptacle connector is latched to the frame in the direction of arrow "A" whereupon, according to the invention, the receptacle connector will be secured in a proper position at the front edge of circuit board assembly 14. This secured position of the receptacle connector is shown in FIG. 3.

Figure 3:
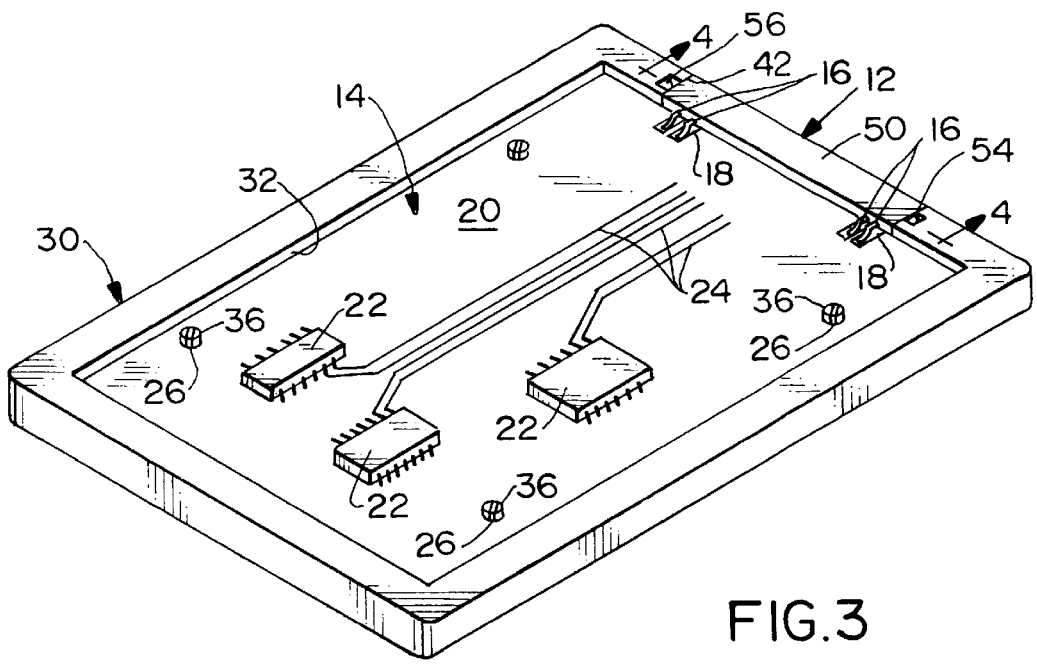
FIG. 3 is a perspective view similar to that of FIG. 2, with the receptacle connector latched to the frame and the connector terminals engaging circuit means on the circuit board assembly.

Generally, the invention contemplates the provision of complementary interengaging latches between frame 30 and receptacle connector 12 for securing the receptacle connector at the edge 25 of circuit board assembly 14 as shown in FIG. 3, and for ensuring a mechanical and electrical connection between surface mount portions 16 of the connector terminals and contact pads 18 on substrate 20 of the circuit board assembly. More particularly, referring to FIG. 4 in conjunction with FIGS. 2 and 3, receptacle connector 12 includes an elongate housing 50 having a latch tongue 52 molded integrally with the housing and projecting outwardly from each end thereof. Each side of opening 42 in frame 30 includes a vertical slot 54 into which the latch tongues are positionable. A latching lip 56 projects inwardly of opening 42 within each slot 54.

Figure 4:
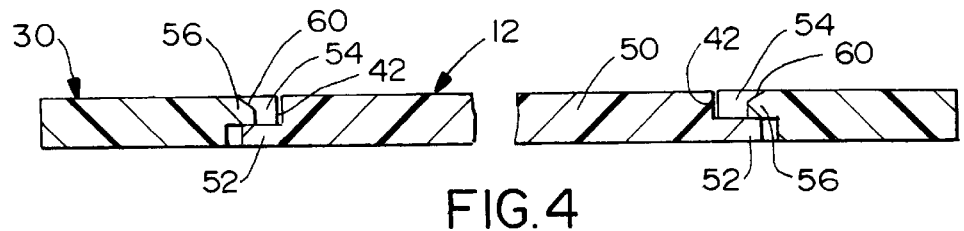
FIG. 4 is a fragmented vertical section, on an enlarged scale, taken generally along line 4—4 in FIG. 3.

In securing receptacle connector 12 to frame 30, the receptacle connector is moved from the position shown in FIG. 2, in the direction of arrow "A", to the latched and secured position shown in FIG. 3. During this positioning movement of the receptacle connector, latch tongues 52 at opposite ends of the connector housing will engage latching lips 56 at opposite sides of opening 42 in the frame. As stated above, the frame is unitarily molded of plastic material, and the frame will spread apart at opening 42 whereupon latch tongues 52 will automatically snap into the positions shown in FIG. 4 beneath the latching lips of the frame. The latching lips are chamfered, as at 60, to facilitate latch tongues 52 of the receptacle connector biasing the frame apart at opening 52. Once the latch tongues clear latching lips 56, the frame will automatically, resiliently snap back into its latching condition as shown in FIG. 4, securing the receptacle latch tongues below the latching lips and thereby securing the receptacle within the frame.

Figure 5A:
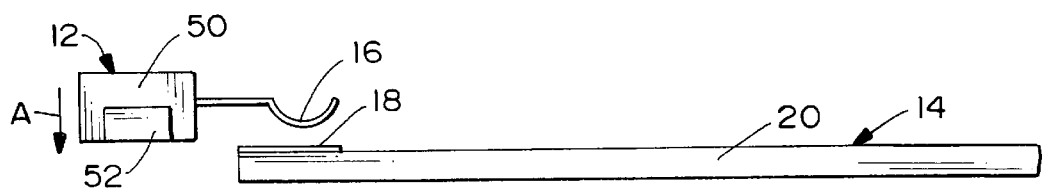
FIGS. 5A and 5B are sequential positions of mounting the receptacle connector relative to the circuit board assembly to show the spring biasing or preloading of the terminals.
Figure 5B:
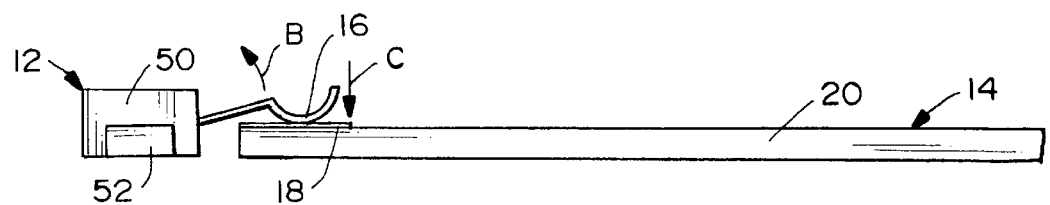

FIGS. 5A and 5B correspond positionally with FIGS. 2 and 3, respectively, in regard to the position of receptacle connector 12 relative to printed circuit board assembly 14, and specifically in regard to the spring biasing or preloading of surface mount portions or tails 16 of the connector terminals. More particularly, FIG. 5A shows the receptacle connector elevated above printed circuit board assembly 14. In other words, the connector is in the position of FIG. 2, not yet latched to the frame. When the connector is latched to the frame in the direction of arrow "A", surface mount portions 16 of the connector terminals are biased upwardly in the direction of arrow "B" (FIG. 5B). The terminals conventionally are fabricated of resilient conductive metal material and, with the terminal tails or surface mount portions being preloaded, the surface mount portions will exert a positive contact pressure on contact pads 18 in the direction of arrow "C" (FIG. 5B).

The invention contemplates a method of fabricating an IC card, such as IC card 10 according to the above concepts. In particular, the method comprises the steps of providing generally rectangular frame 30 for receiving circuit board assembly 14. The circuit board assembly is mounted on the frame as shown in FIG. 2. The receptacle connector then is mounted on the frame at the edge of the circuit board assembly. During mounting of the receptacle connector, the complementary interengaging latches (i.e. latch tongues 52 and latching lips 56) automatically interengage and secure the receptacle connector in proper position at the edge of the circuit board assembly as shown in FIGS. 3 and 4, and ensure proper mechanical and electrical connections between surface mount portions 16 of the connector terminals and contact pads 18 of the printed circuit board assembly as shown in FIG. 5B.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method of fabricating an IC card, comprising the steps of:

providing a generally rectangular frame;

mounting a circuit board assembly on the frame, with the circuit board assembly including circuit means thereon; and securing a receptacle connector on the frame at an edge of the circuit board assembly after the circuit board assembly is mounted to the frame and ensuring a mechanical and electrical connection between terminals of the connector and the circuit means on the circuit board assembly.

2. The method of claim 1 wherein said securing step comprises latching the receptacle connector to the frame in a snapping action in response to properly positioning the receptacle connector onto the frame.

3. The method of claim 1, further comprising the step of spring biasing surface mount portions of the connector terminals against the circuit means on the printed circuit board assembly in response to properly positioning the receptacle connector onto the frame.

4. The method of claim 1, wherein said receptacle connector is secured on said frame after the assembly is mounted on the frame.

5. A method of fabricating an IC card, comprising the steps of:

providing a generally rectangular frame;

mounting a circuit board assembly on the frame, with the circuit board assembly including circuit means thereon; and securing a receptacle connector on the frame at an edge of the circuit board assembly and spring biasing surface mount terminals of the connector against one surface of the circuit board assembly thereby ensuring a mechanical and electrical connection between the surface mount terminals of the connector and the circuit means on the circuit board assembly.

6. The method of claim 5, wherein said receptacle connector is secured on said frame after the assembly is mounted on the frame.

* * * * *